United States Patent
Frizzell

(10) Patent No.: US 10,816,658 B2
(45) Date of Patent: Oct. 27, 2020

(54) RADAR ENABLED WEAPON DETECTION SYSTEM

(71) Applicant: OmniPreSense Corporation, San Jose, CA (US)

(72) Inventor: Robert L Frizzell, San Jose, CA (US)

(73) Assignee: OmniPreSense Corporation, San Jose, CA (US)

( * ) Notice: Subject to any disclaimer, the term of this patent is extended or adjusted under 35 U.S.C. 154(b) by 486 days.

(21) Appl. No.: 15/697,532

(22) Filed: Sep. 7, 2017

(65) Prior Publication Data
US 2018/0067204 A1    Mar. 8, 2018

Related U.S. Application Data

(60) Provisional application No. 62/384,665, filed on Sep. 7, 2016.

(51) Int. Cl.
*G01S 13/86* (2006.01)
*H01Q 3/34* (2006.01)
(Continued)

(52) U.S. Cl.
CPC .......... *G01S 13/867* (2013.01); *G01S 13/887* (2013.01); *H01Q 3/34* (2013.01); *G01S 2013/0245* (2013.01)

(58) Field of Classification Search
CPC .............. G01S 13/867; G01S 13/887; G01S 2013/0245; H01Q 3/34
(Continued)

(56) References Cited

U.S. PATENT DOCUMENTS

| 4,009,476 A | 2/1977 | Lutz |
| 4,827,264 A | 5/1989 | Bjelk |

(Continued)

FOREIGN PATENT DOCUMENTS

| DE | 10234291.1 | 2/2004 |
| DE | 2008008142.6 | 8/2008 |

(Continued)

OTHER PUBLICATIONS

Mass Shooting Tracker, https://www.massshootingtracker.org/data/ 2016, accessed Aug. 27, 2017.
(Continued)

*Primary Examiner* — Bernarr E Gregory
*Assistant Examiner* — Nuzhat Pervin
(74) *Attorney, Agent, or Firm* — Dovas Law, P.C.

(57) ABSTRACT

A method for detecting potential security threats is provided. An image sensor configured for image capture and a radar device comprising a phased array of antennas configured to transmit and receive are provided. Images are captured by the image sensor. Signals emitted by the phased array of antennas are beam steered to scan a field of view of the radar device, reflected signals are received by the phased array of antennas, and a location of a particular object is determined based on the signals received by the phased array of antennas. A field of view of the radar device is mapped over images captured by the image sensor, and the images are transmitted showing the particular object based on the mapping of the field of view of the radar device over the captured images. Further provided is a camera system including an image sensor and a radar device.

34 Claims, 7 Drawing Sheets

(51) Int. Cl.
*G01S 13/88* (2006.01)
*G01S 13/02* (2006.01)

(58) Field of Classification Search
USPC .......................................................... 342/52
See application file for complete search history.

(56) References Cited

U.S. PATENT DOCUMENTS

| | | | |
|---|---|---|---|
| 5,142,152 A | 8/1992 | Boiucaner | |
| 5,196,826 A | 3/1993 | Whiting | |
| 5,903,217 A | 5/1999 | Stanczak et al. | |
| 6,084,367 A | 7/2000 | Landert | |
| 6,087,972 A | 7/2000 | Puglia et al. | |
| 6,114,956 A | 9/2000 | Van Genechten | |
| 6,250,601 B1 | 6/2001 | Kolar et al. | |
| 6,417,797 B1* | 7/2002 | Cousins | G06F 15/02 342/175 |
| 6,525,659 B2 | 2/2003 | Jaffe et al. | |
| 6,856,272 B2 | 2/2005 | Levitan et al. | |
| 6,876,322 B2 | 4/2005 | Keller | |
| 7,019,682 B1* | 3/2006 | Louberg | G01S 7/03 342/22 |
| 7,042,492 B2 | 5/2006 | Spinelli | |
| 7,209,221 B2* | 4/2007 | Breed | G01S 17/04 356/5.02 |
| 7,359,782 B2* | 4/2008 | Breed | B60R 21/0134 701/45 |
| 7,768,444 B1 | 8/2010 | Rourk | |
| 7,783,403 B2* | 8/2010 | Breed | G01S 17/931 701/45 |
| 7,796,081 B2* | 9/2010 | Breed | B60W 30/18154 342/70 |
| 7,852,462 B2* | 12/2010 | Breed | B60Q 9/008 356/4.01 |
| 7,983,802 B2* | 7/2011 | Breed | G08G 1/161 701/1 |
| 8,421,668 B2 | 4/2013 | Ammar | |
| 8,692,708 B2* | 4/2014 | Nogueira-Nine | G01S 13/887 342/179 |
| 8,773,719 B2 | 7/2014 | Baba et al. | |
| 8,825,260 B1* | 9/2014 | Silver | G01S 13/865 701/23 |
| 8,886,387 B1* | 11/2014 | Agarwal | G06K 9/00791 701/28 |
| 9,316,732 B1 | 4/2016 | Mohamadi | |
| 9,395,727 B1* | 7/2016 | Smith | G01S 13/42 |
| 10,404,261 B1* | 9/2019 | Josefsberg | H03L 7/091 |
| 2001/0009404 A1 | 7/2001 | Paese et al. | |
| 2001/0030606 A1 | 10/2001 | Jaffe et al. | |
| 2003/0122514 A1 | 7/2003 | Mercier et al. | |
| 2004/0080315 A1 | 4/2004 | Beevor et al. | |
| 2005/0195383 A1* | 9/2005 | Breed | B60N 2/28 356/4.01 |
| 2005/0278098 A1* | 12/2005 | Breed | G01S 13/931 701/45 |
| 2006/0139453 A1 | 6/2006 | Spinelli | |
| 2006/0164289 A1 | 7/2006 | Nakagawa et al. | |
| 2007/0159922 A1* | 7/2007 | Zimmerman | G01S 7/52003 367/103 |
| 2007/0182528 A1* | 8/2007 | Breed | B60Q 9/008 340/435 |
| 2008/0007404 A1 | 1/2008 | Albert et al. | |
| 2008/0040004 A1* | 2/2008 | Breed | B60R 21/0134 701/45 |
| 2008/0046150 A1* | 2/2008 | Breed | B60R 21/0134 701/45 |
| 2008/0100498 A1 | 5/2008 | Fullerton et al. | |
| 2008/0129581 A1 | 6/2008 | Douglass et al. | |
| 2008/0150786 A1* | 6/2008 | Breed | G01S 19/42 342/53 |
| 2008/0167819 A1* | 7/2008 | Breed | G08G 1/161 701/300 |
| 2008/0236048 A1 | 10/2008 | Kowalczyk et al. | |
| 2008/0284636 A1 | 11/2008 | Hausner et al. | |
| 2009/0090596 A1 | 4/2009 | Kucer et al. | |
| 2009/0140887 A1* | 6/2009 | Breed | G01S 17/86 340/990 |
| 2010/0109938 A1* | 5/2010 | Oswald | G01S 13/522 342/90 |
| 2010/0295718 A1* | 11/2010 | Mohamadi | G01S 13/888 342/21 |
| 2011/0190972 A1* | 8/2011 | Timmons | G08G 1/166 701/31.4 |
| 2012/0144748 A1 | 6/2012 | Ranaudo et al. | |
| 2012/0182541 A1* | 7/2012 | Canham | G01S 7/4802 356/5.01 |
| 2012/0268311 A1* | 10/2012 | Lynam | B60T 7/22 342/70 |
| 2012/0296567 A1* | 11/2012 | Breed | G01C 21/26 701/468 |
| 2013/0054603 A1* | 2/2013 | Birdwell | G06K 9/6253 707/738 |
| 2013/0106643 A1 | 5/2013 | Wahlquist et al. | |
| 2013/0148855 A1* | 6/2013 | Yasugi | G06T 5/002 382/103 |
| 2013/0194128 A1* | 8/2013 | Van Der Merwe | H01Q 19/06 342/107 |
| 2013/0251193 A1* | 9/2013 | Schamp | G06T 7/593 382/103 |
| 2013/0251194 A1* | 9/2013 | Schamp | G06T 7/11 382/103 |
| 2013/0335259 A1* | 12/2013 | Yasugi | G08G 1/04 342/52 |
| 2014/0022109 A1* | 1/2014 | Lee | G01S 13/931 342/70 |
| 2014/0197979 A1 | 7/2014 | Saito | |
| 2015/0070207 A1* | 3/2015 | Millar | G01S 13/4454 342/174 |
| 2015/0185314 A1* | 7/2015 | Corcos | G01S 7/35 342/200 |
| 2015/0226837 A1* | 8/2015 | Corcos | H01Q 21/065 342/106 |
| 2015/0301167 A1* | 10/2015 | Sentelle | G01S 13/888 342/22 |
| 2016/0049008 A1 | 2/2016 | Haddick et al. | |
| 2016/0187476 A1* | 6/2016 | Wang | G01S 13/42 342/52 |
| 2016/0187477 A1* | 6/2016 | Wang | G01S 7/03 342/52 |
| 2017/0085771 A1* | 3/2017 | Schwager | H04N 5/23212 |
| 2017/0124781 A1* | 5/2017 | Douillard | G08G 1/202 |
| 2017/0261599 A1* | 9/2017 | Zeng | G01S 7/4026 |
| 2017/0294123 A1* | 10/2017 | Baba | B60R 21/00 |
| 2019/0025057 A1* | 1/2019 | Sakai | G08G 1/20 |
| 2019/0072399 A1* | 3/2019 | Sakai | G01C 21/3415 |

FOREIGN PATENT DOCUMENTS

| | | | | |
|---|---|---|---|---|
| JP | 2016080698 A | * | 5/2016 | ............ G01S 13/86 |
| WO | WO199959116 | | 11/1999 | |
| WO | WO2009144002 | | 12/2009 | |

OTHER PUBLICATIONS

MegaFace Challenge FGNet Results, http://megaface.cs.washington.edu/results/fgnet.html, accessed Sep. 6, 2017.

* cited by examiner

RADAR ENABLED WEAPON DETECTION SYSTEM

CROSS REFERENCE TO RELATED APPLICATION(S)

This application claims the benefit of U.S. Provisional Application No. 62/384,665, filed Sep. 7, 2016, which is incorporated by reference as if fully set forth.

BACKGROUND

Mass shootings have become a continuous threat causing significant loss of life. Shootings can occur at any time or place and without warning. Over 475 mass shootings occurred in the US alone in 2016 resulting in more than 600 deaths and 1,750 injuries (Mass Shooting tracker www-.massshootingtracker.org/data/2016). Technologies to detect guns such as scanners and magnetometers are expensive, intrusive, require operator control, and generally limited to select public facilities such as airports.

Mass shootings and terrorism have been on the rise over the last couple of decades. The traditional way to prevent these events is with security cameras. However, security cameras have many deficiencies and provide little or no warning for these threatening events. These deficiencies include image recognition which cannot detect weapons, too many video streams for safety officers to monitor, and the inability to see concealed weapons underneath clothing. Software image recognition requires extremely large processing power and is still not able to provide accurate recognition of a gun. The best facial recognition software is not dependably accurate as shown in the results of MegaFace™ Challenge. A gun is more difficult to recognize than a face and can be concealed out of view of the recognition software. Adding to the problem, in a given controlled area there are generally too many security video streams for security professionals to monitor. Some estimates indicate security cameras generate over 600 Petabytes of information worldwide every day. This is far too much data for security professionals to review continuously. This problem is getting worse as more and more security cameras are put in the field.

Other methods of detecting metal or guns at airports and other public facilities make use of millimeter waves to detect objects underneath clothing. These systems use very high bandwidth (2 to 10 GHz) to achieve high resolution but are expensive, very short range (0.2 to 0.4 meters), and require one or more operators. Magnetometer based solutions exist which are similarly high cost, short range, and require an operator. Neither technology can provide unobtrusive scanning for metal or weapons at distances greater than 1 meter and thus give no pre-warning for authorities to act upon.

Known technologies such as used in airport scanners require large, expensive, intrusive systems, and are subject to short range 1 meter) for determining a weapon on a person. See U.S. Pat. Nos. 6,876,322, 8,421,668, and 9,316,732. Other technology such as disclosed in U.S. Pat. No. 6,856,272 and U.S. Patent Application Publication No. 2008/0129581 conceive of multiple radar systems to help detect weapons, but they are manually or mechanically steered to the object or direction of interest.

SUMMARY

This Summary introduces simplified concepts that are further described below in the Detailed Description of Illustrative Embodiments. This Summary is not intended to identify key features or essential features of the claimed subject matter and is not intended to be used to limit the scope of the claimed subject matter.

A method is provided for detecting and communicating potential security threats. The method includes providing an image sensor configured for image capture and a radar device comprising a phased array of antennas configured to transmit and receive. One or more images are captured by the image sensor. Signals emitted by the phased array of antennas are beam steered to scan a field of view of the radar device, reflected signals are received by the phased array of antennas, and a location of a particular object is determined based on the signals received by the phased array of antennas. A field of view of the radar device is mapped over the one or more images captured by the image sensor, and the one or more images are transmitted showing the particular object based on the mapping of the field of view of the radar device over the one or more images captured by the image sensor.

In another method a plurality of camera devices are provided each comprising an image sensor configured for video capture and a radar device comprising a phased array of antennas configured to transmit and receive. The image sensors of the plurality of camera devices capture a plurality of video images. The plurality of video images of the plurality of camera devices are displayed on one or more displays. Signals emitted by the phased array of antennas of the plurality of camera devices are beam steered to scan fields of view of the radar devices, and reflected signals are received by the phased array of antennas of the plurality of camera devices. A particular object is detected based on the signals received by the phased array of antennas of a particular camera device of the plurality of camera devices. A field of view of the radar device of the particular camera device is mapped over the video images captured by the image sensor of the particular camera device, and the video images captured by the image sensor of the particular camera device are displayed at least one of highlighted or enlarged relative to video images captured by the image sensor of at least one other of the plurality of camera devices based on the detecting of the particular object and based on the mapping of the field of view of the radar device over video images captured by the image sensor of the particular camera device.

A camera system is further provided. The camera system includes an image sensor configured for image capture and a radar device comprising a phased array of antennas configured to transmit and receive. One or more processors of the system are configured to beam steer signals emitted by the phased array of antennas to scan a field of view of the radar device, determine based on signals received by the phased array of antennas a location of a particular individual, determine based on the signals received by the phased array of antennas a particular object carried by the particular individual, map the field of view of the radar device over a field of view of the image sensor, transmit an image captured by the image sensor showing the particular individual based on the mapping of the field of view of the radar device over a field of view of the image sensor, and transmit an alert highlighting the particular object within the image captured by the image sensor.

BRIEF DESCRIPTION OF THE DRAWING(S)

A more detailed understanding may be had from the following detailed description, given by way of example with the accompanying drawings. The Figures in the drawings and the detailed description are examples. The Figures and the detailed description are not to be considered limiting and other examples are possible. Like reference numerals in the Figures indicate like elements wherein.

DESCRIPTIVE KEY

Figure 1:
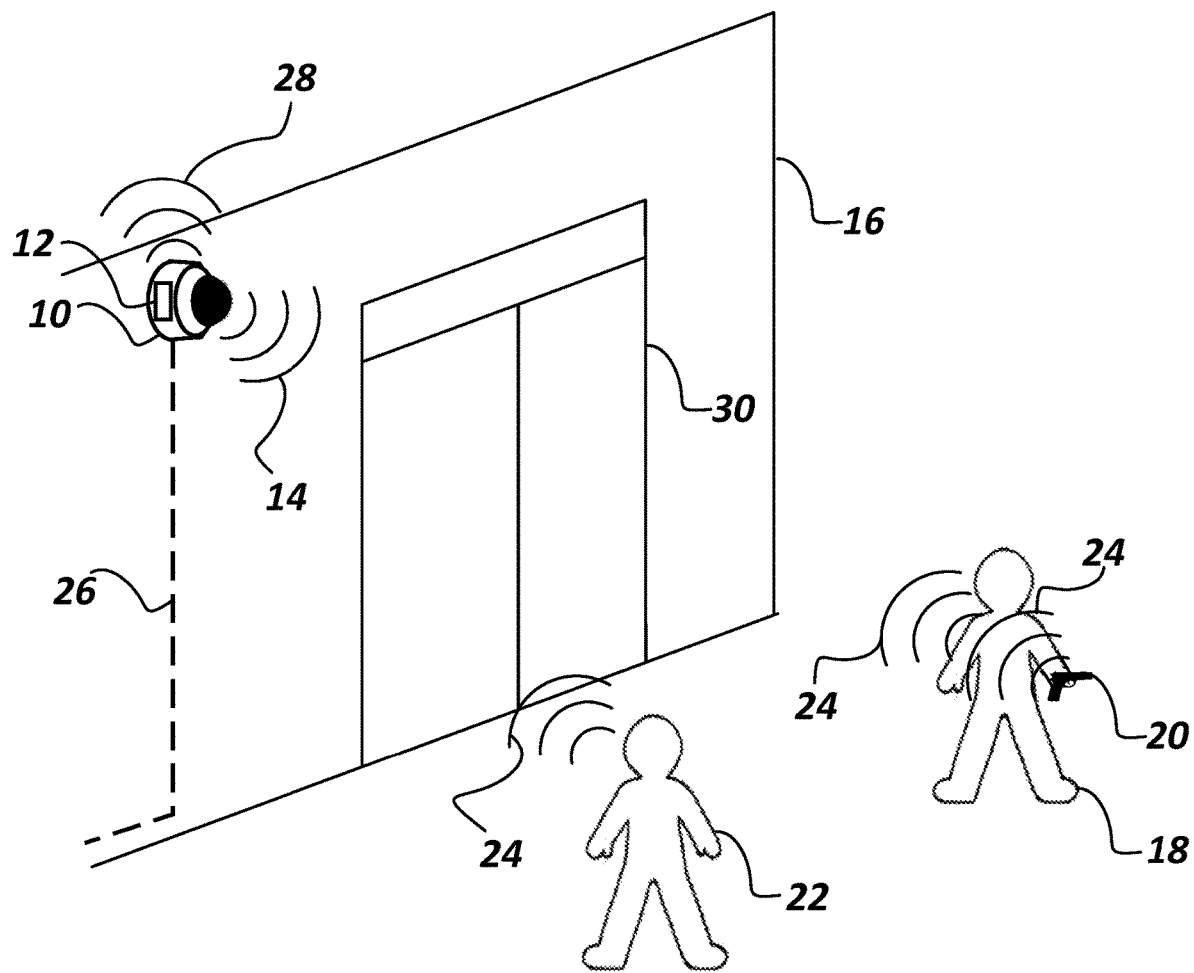
FIG. 1 shows a radar-enabled security camera device installed in an exemplary environment.

8 Monitoring system
10 Camera device
12 Radar module
14 Transmitted radar pulses
16 Building wall
18 detectable object (person/body)
20 detectable object (firearm on person/body)
22 detectable object (person/body)
24 Reflected radar signals
26 Camera wired network connection
28 Camera wireless network connection
30 Building entrance
32 Reference datastore
34 Radar signal processor
36 Radar RF device
38 Bus interface
40 Camera video processor
42 Image sensor
44 Wireless network transceiver
46 Cabled network connection
48 Millimeter wave antennas
50 Phased array of antennas
52 Electromagnetic beam
54 Non-beam-steered electromagnetic beam path
56 Vertical beam steering
58 Horizontal beam steering
60 Millimeter wave amplifier
62 Millimeter wave phase shifter
64 Millimeter wave signal modulator
66 Processor interface
68 Field of view plane at 5 meters
70 Field of view plane at 10 meters
72 Field of view plane at 20 meters
74 Network-connected server
76 Camera network
78 Display
80 Security camera video streams
82 Alert security camera video stream
84 Overlay on video stream
86 Confirm button for feedback and machine learning/artificial intelligence
88 Centerlines
90 Direction of travel
92 Server datastore
94 Reject button for feedback and machine learning/artificial intelligence

DETAILED DESCRIPTION OF ILLUSTRATIVE EMBODIMENT(S)

A system and method is provided herein for detecting firearms or other threatening objects typically carried by an assailant. The system is configurable as a small, low power, short-range radar module embedded within a security camera. Upon determining a threat, the system can utilize a security camera network to send immediate alerts. For example, the system can detect individuals carrying guns at distances of 5-20 meters away, and system users can be provided 5-20 seconds to confirm the detected threat and potentially act before a shooting or other hazardous event occurs. Feedback to the radar module, for example based on user confirmation or rejection of a detected hazard, can be implemented to improve system operation over time.

Figure 7:
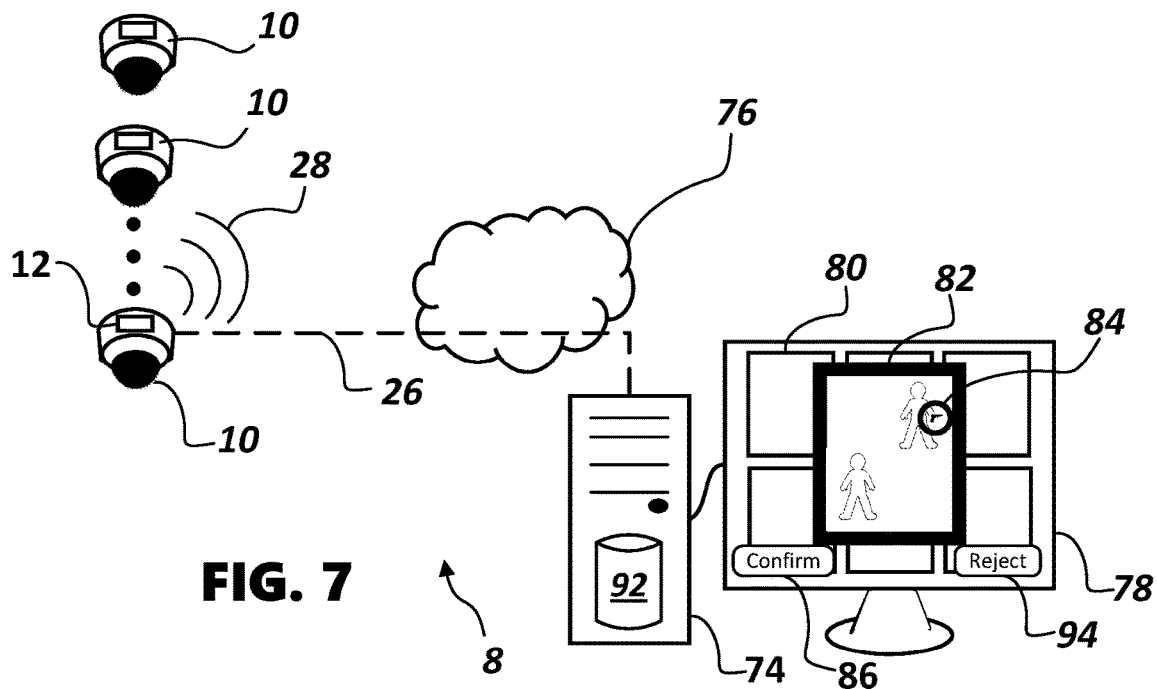
FIG. 7 shows a radar-enabled security camera network including the camera device of FIG. 1 and a display with an alert message.

Referring to FIGS. 1 and 7, a camera device 10 employable in a network-enabled monitoring system 8 is provided. The camera device 10 includes an embedded short-range radar module 12 beneficially enabled to detect objects at distances of approximately 5 to 20 meters. Alternatively, the camera device 10 can be configured for detecting objects at shorter or longer distances. The monitoring system 8 can for example be used to detect and report metal the size of a firearm 20 on a person 18, 22, and based on this, determine if a threatening event is imminent. If a threatening event is predicted based on the detection of metal or other particular material of a particular size, an alert is sent over a security camera network 76 to one or more users who may verify the situation and take appropriate action as needed. In this manner, the monitoring system 8 can be used in the prevention of weapon assaults such as mass shootings.

The camera device 10 can be mounted on a building wall 16, roof, or other support structure to provide a set field of view, beneficially covering 60-90° horizontally and vertically. The camera device 10 can be positioned in proximity to an entrance 30 of a building or other area which is desired to be controlled. In another embodiment, the camera device 10 including the radar module 12 may be mobile for example mounted on a drone, robot, or other vehicle. To keep the size of the radar module 12 small enough to fit within the camera device 10, the radar module 12 is beneficially configured to transmit and frequencies in the millimeter wave range.

Figure 2:
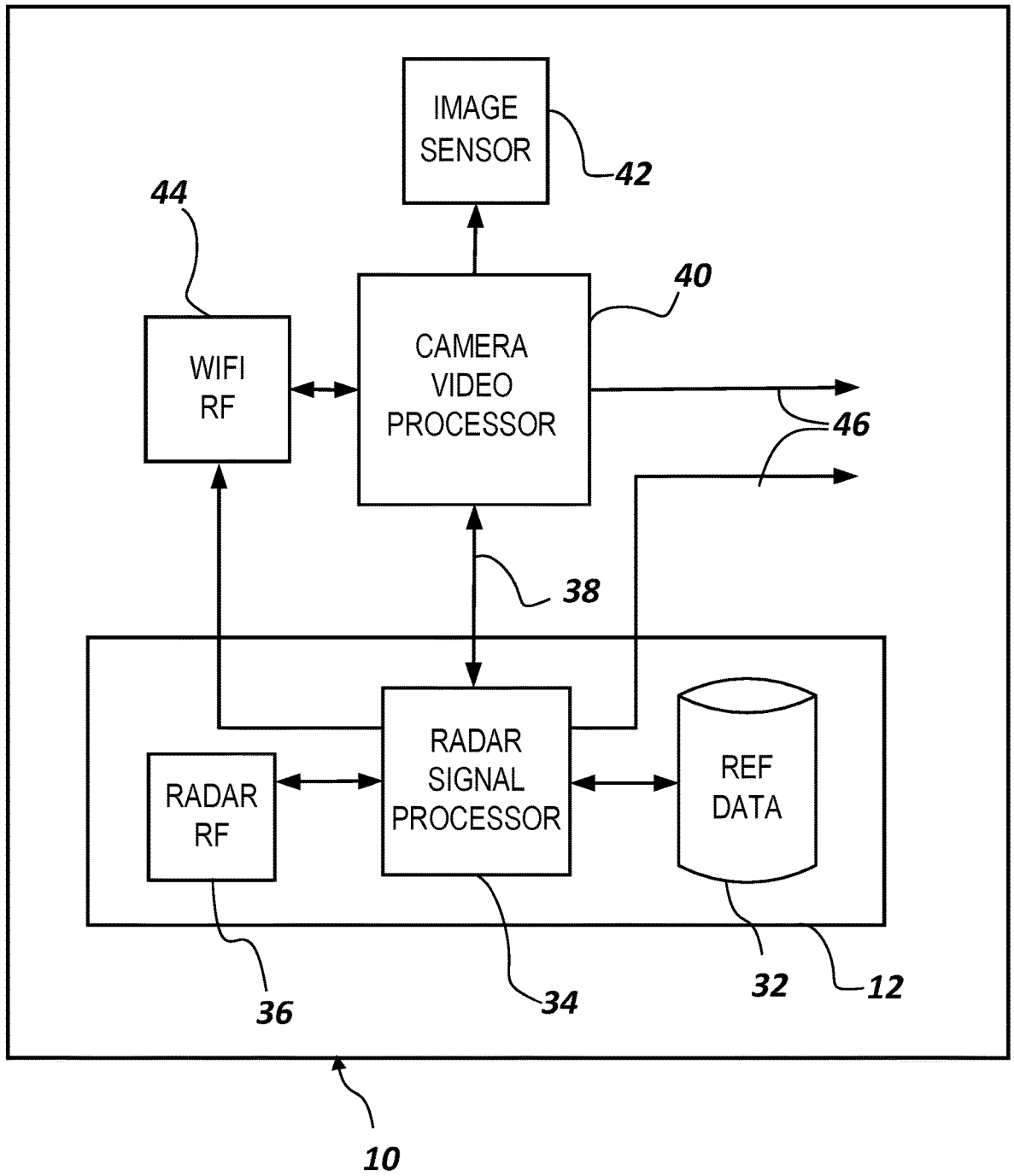
FIG. 2 is a diagram of the radar-enabled security camera device of FIG. 1.

Referring to FIG. 2, the radar module 12 includes a radar RF device 36 under the control of a radar signal processor 34. Beneficially, the RF device is a millimeter wave RF device which emits signals in the range of approximately 10 to 300 GHz and wavelengths of approximately 1 mm to 30 mm. More beneficially, the RF device is configured to operate in the 24-81 GHz range, and most beneficially at approximately 60 GHz. The radar module 12 embedded in the camera device 10 communicates over an interface 38 such as I²C, SPI, UART, USB or other suitable interface to the camera video processor 40 and/or the security camera network 76. The interface 38 is used to communicate alerts, coordinate information, control, and threat feedback information between the radar module 12, video processor 40, and security network 26, 28, 76. The video processor 40 captures and processes the video images from the image sensor 42. The processed video and radar data is sent over either a wireless network transceiver 44 (e.g., WiFi™ protocol transceiver) or wired network connection 46.

Figure 5:
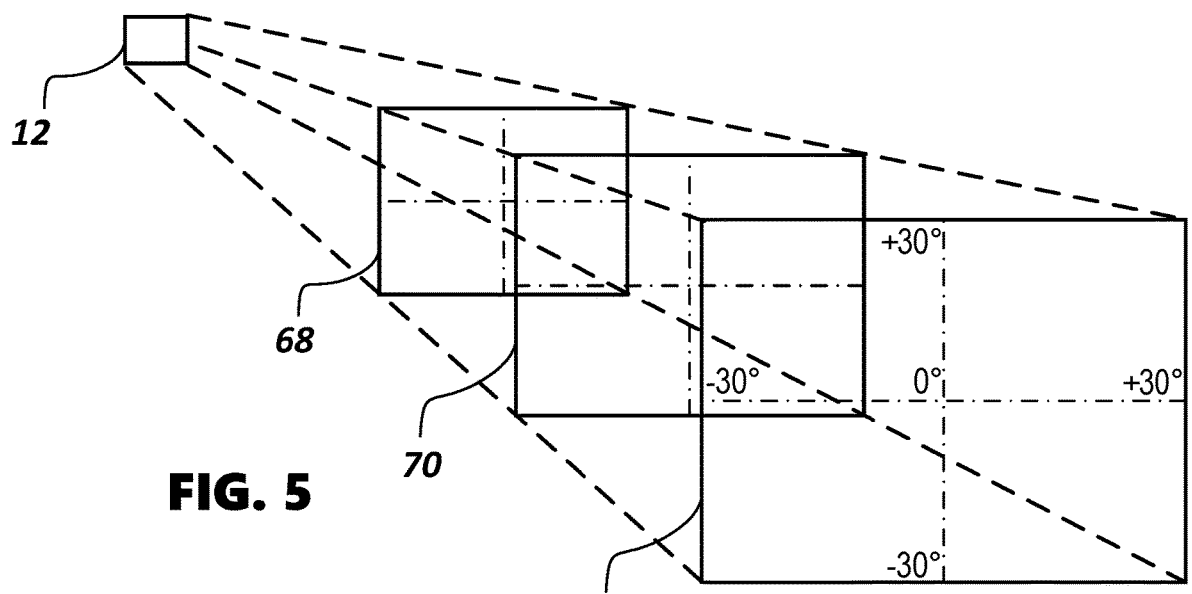
FIG. 5 shows a field of view of the radar module shown in FIG. 3.
Figure 6:
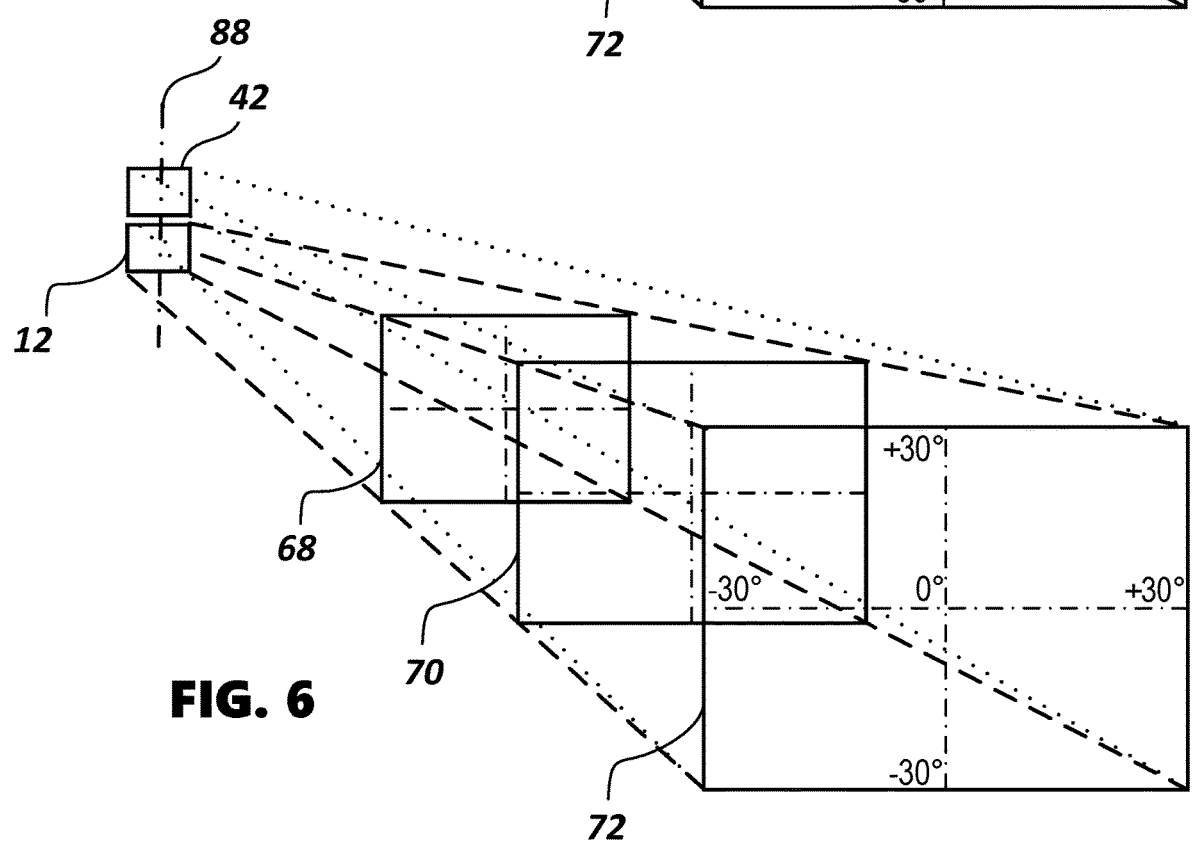
FIG. 6 shows a field of view of the radar module and a field of view of an image sensor of the camera device of FIG. 1 aligned therewith.
Figure 8:
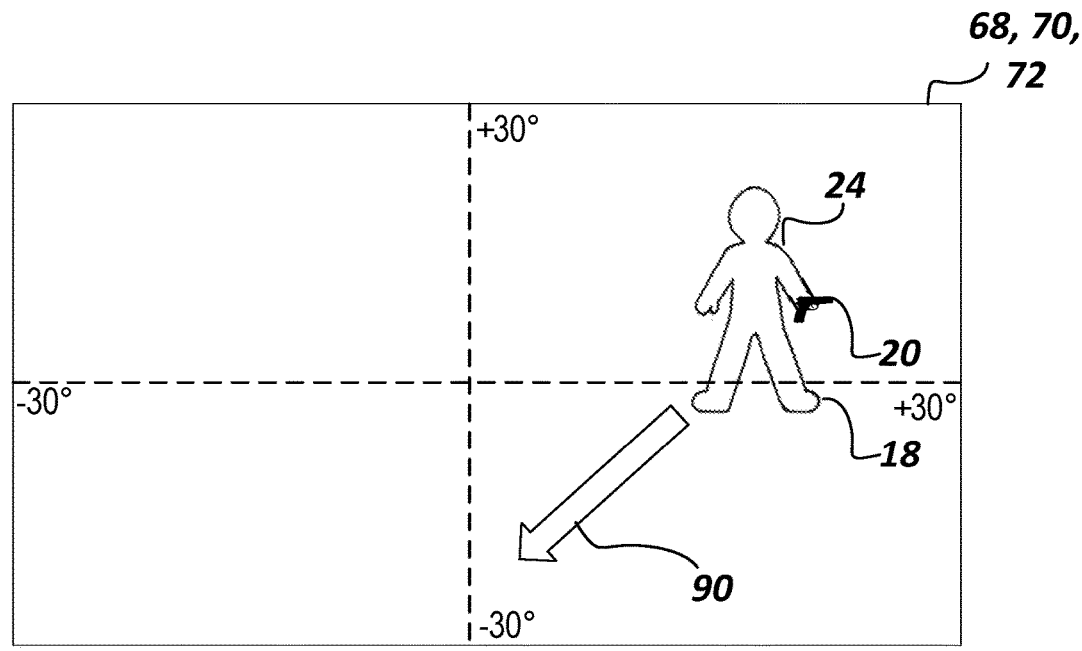
FIG. 8 is an elevation view of the field of view of the radar module of FIG. 3.

Referring to FIGS. 2, 5, 6, and 9, the field of view 68, 70, 72 of the radar module 12 is mapped over the field of view of the image sensor 42. Beneficially, the field of view angles of the radar module 12 and the image sensor 42 are substantially the same or very similar. The exemplary field of view shown in FIGS. 5, 6, and 8 is 60° horizontal and 60° vertical, where a plane 68 corresponds to 5 meters, a plane 70 corresponds to 10 meters, and a plane 72 corresponds to 20 meters from the image sensor 42. The mapping can be performed mechanically and/or electronically. In one embodiment, the radar module 12 and the image sensor 42 are aligned mechanically such that the center lines 88 of the radar module 12 and the image sensor 42 are fixed to substantially the same point. Alternatively, and/or in addition to mechanical alignment, the field of view 68, 70, 72 of the radar module 12 can be electronically mapped to that of the image sensor 42. Knowledge of any mismatch between the field of views of the radar module 12 and the image sensor 42 is used to adjust the coordinates reported by the radar module 12 to properly map over the field of view of the image sensor 42.

The radar module 12 operates by sending millimeter wave pulses 14 with set timing and modulation. The pulse 14 timing and modulation is under control of the signal processor 34. Methods such as constant wave ("CW"), frequency modulated constant wave ("FMCW"), or multi-frequency constant wave ("MFCW") are among acceptable modulations schemes. In one embodiment FMCW is utilized to determine range to the object of interest as well as material classification. Other modulation methods can be employed which beneficially enable high data throughput and resolution while not requiring significant bandwidth 4 GHz) or a large antenna array.

Figure 3:
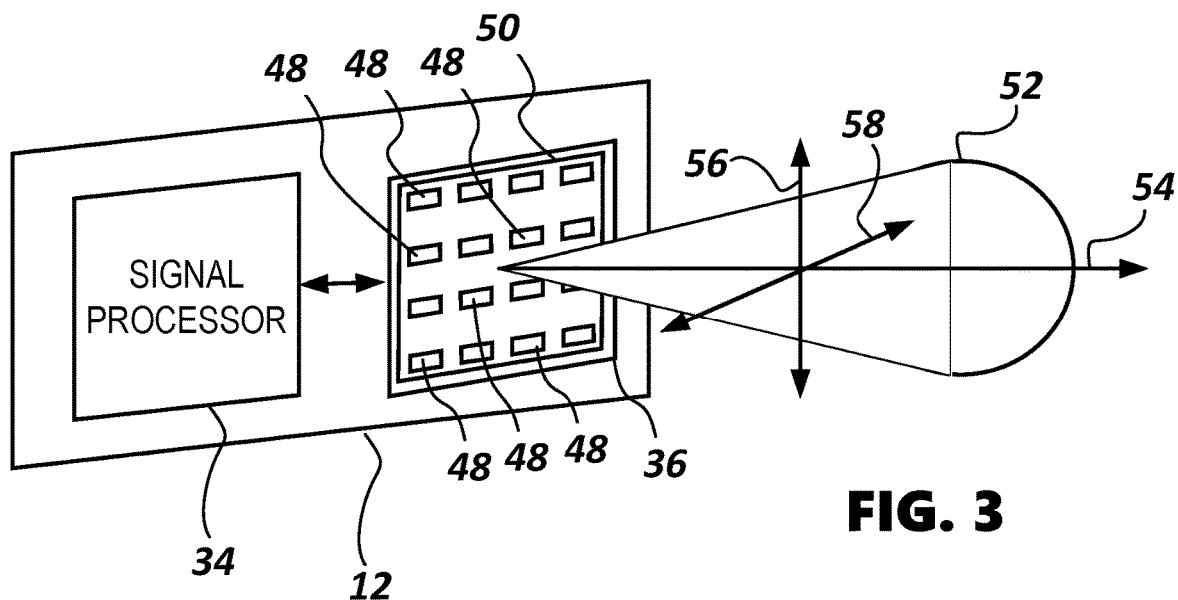
FIG. 3 is a diagram of a radar module of the camera device of FIG. 1 depicting transmission of a steered electromagnetic beam.
Figure 4:
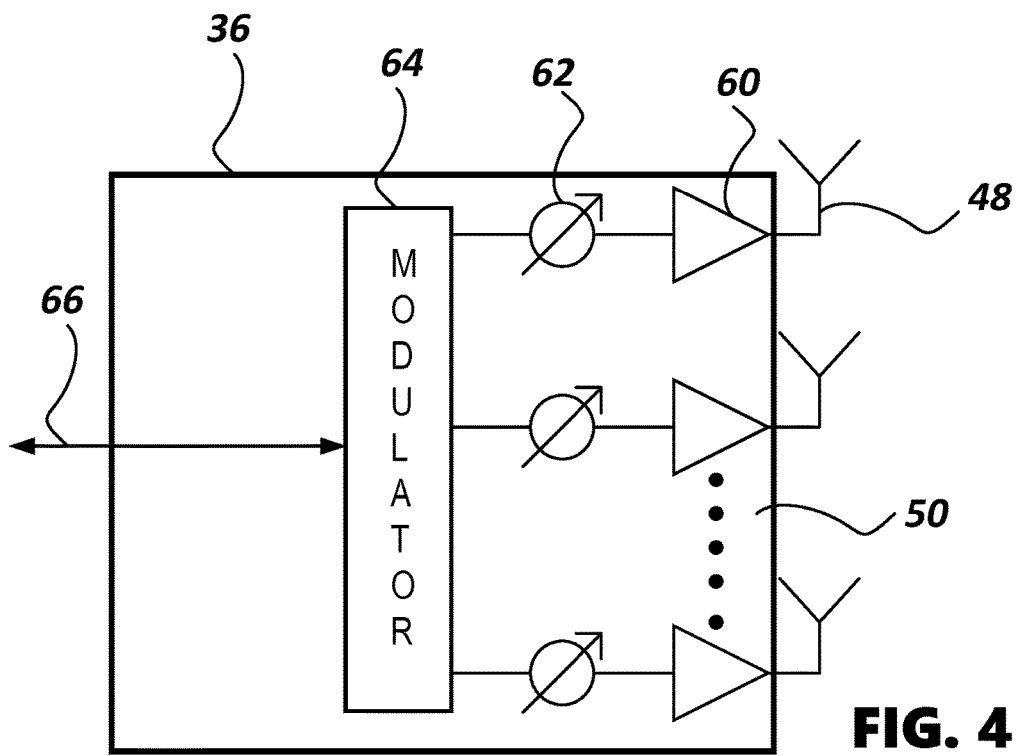
FIG. 4 is a diagram of a radio frequency ("RF") device of the radar module shown in FIG. 3 with phase control for electronic beam steering.

The radar module 12 receives signal reflections 24 from example objects 18, 20, 22 in its field of view 68, 70, 72. Example objects 18 and 22 are bodies of human persons, and example object 20 is a firearm 20 carried by the person 18. Various other types of objects, for example vehicles may also be detected by the radar module 12. Based on the received signals 24, the signal processor 34 calculates information about the objects 18, 20, 22 being tracked, for example along a particular direction of travel 90 as shown in FIG. 8. This information includes but is not limited to motion detection, speed, direction, range, angle of approach, radar cross section (RCS), and material composition. Speed, direction, and range are calculated based on the Doppler shift of the returned signals 24 and/or time of flight information. Referring to FIGS. 3 and 4, angle of approach is calculated by determining a returned signal phase difference between two or more antennas 48 to calculate the angle from which the signal came. Material classification utilizes the returned signal strength, resonant frequency, unique signal signatures of the material, or signal polarization to determine classification and identification of material of objects. Alternatively, other signal qualities can be used for material classification. Signal information from multiple objects 18, 20, 22 tracked in the radar module field of view 68, 70, 72 can be substantially simultaneously gathered or gathered near in time. This information (speed, direction, range, angle of arrival, material classification) can be analyzed locally or selectively transmitted to another system for further processing or display.

Referring to FIGS. 1, 3, 4, 5, and 6, the radar module 12 includes a phased array 50 of transmit and receive antennas 48. Beneficially, the antennas 48 are millimeter wave antennas configured for operation at frequencies of approximately 10 to 300 GHz. Each of the antennas 48 can be configured to transmit and receive. Alternatively, a portion (e.g., half) of the antennas 48 can be provided in a transmit array configured to transmit, and another portion (e.g., half) of the antennas 48 can be provided in a receive array configured to receive. The transmit array has several independent antennas 48 which are provided the same modulated signal via a modulator 64 which is amplified via amplifiers 60. The phase to each of the antennas 48 can be changed by a phase shifter 62 under control of the signal processor 34 via an interface 66 to perform vertical and horizontal beam steering 56, 58 of an electromagnetic beam 52 from a fixed position straight forward 54. This allows the field of view to be scanned by the transmit pulses 14 and provides improved strength of returned signals 24 for positions within the field of view 68, 70, 72. Likewise, the receive antennas 48 are steered to look for reflected signals 24 from different locations in the field of view 68, 70, 72, for example via phase shifters 62 and modulator 64. Radar processing techniques such as Inverse Synthetic Aperture Radar (ISAR) are used to image the objects in the field of view 68, 70, 72. The ability to vertically and horizontally scan 56, 58 the field of view 68, 70, 72 is used along with ISAR algorithms to enhance the resolution of the reflected image for better object and material classification, as well as improving coordinate information about the location of the threatening objects such as the firearm 20. Beneficially, the antenna array 50 is integrated on a single RF device 36 for optimal sizing to enable fitting the antenna array 50 inside of a camera device. In an alternative approach, phase array antennas 48 can be printed on a main printed circuit board of the radar module 12.

The radar module 12 utilizes the information gathered to determine if a particular object is a firearm or another threatening object. Referring further to FIG. 8, the outline shape of the object 18 corresponding to a body of a person 18 within the field of view 68, 70, 72, the shape of a particular object 20 of interest carried by the person, and a location where the particular object 20 resides on the person 18 can be determined by the radar module 12 via reflected signals 24. An outline of the body of the person 18 can be determined from speed and range information from the radar module 12. Range information can provide a first indication of the location of the body of the person 18 in the field of view 68, 70, 72 as well as its general shape. Velocity and acceleration of individual body parts of the person 18 can be used to determine what points are the torso, arms/hands, and legs/feet, wherein the arms/hands/legs/feet typically correspond to greater and more frequent acceleration/deceleration than the torso.

Looking at the reflected signals 24 received by the plurality of antennas 48, the size and shape of a particular object 20 can be estimated by the signal processor 34 or other processing device connected to the camera device 10, for example the network-connected server 74 or other computing device. The estimated object shape and size can be compared with scaled reference shapes stored in a datastore. For example, the estimated shape and size of the particular object 20 is compared to known shapes and sizes for rifles [long barrel rifle, approximately 1 meter in length) and hand guns (L-shaped, 0.1-0.2 meter each length). It is further determined if the particular object 20 is positioned at particular locations on the body of the person 18 that may represent a threat. For example, a particular object 20 having the size, shape, and/or material of a firearm determined to be located in a position where hands of the body 18, 22 are located can result in a positive threat alert. Whereas, a metal object noted to be on the feet of the body 18, 22, may not be considered a threat or result in an alert.

If the particular object 20 is determined to be a firearm 20 or other threatening object, an alert is sent from the radar module 12 to the camera video processor 40 via the interface 38 and/or over the security camera network 76 for example to the server 74. An Application Program Interface ("API") is provided for communicating this information over the interface 38 between the radar module 12 and the camera video processor 40. The information communicated over the network 76 may be any suitable form, preferably standardized, and communicated over the wired connection 26 or wireless connection 28.

In addition to information about the objects noted above, the radar module 12 can calculate coordinate information about the objects in the radar field of view 68, 70, 72. The field of view can be considered planes at different ranges from the radar module 12 such as at 5 meters 68, 10 meters 70, or 20 meters 72. The coordinate system may provide information such as how many degrees left/right (azimuth) or up/down (altitude/elevation) the object is from the center of the field of view. The radar module 12 via the signal processor 34 can also calculate distance from the antenna array 50 to an object located in both the azimuth and altitude/elevation. The coordinate system is matched to the video field of view captured by the image sensor 42 so that an overlay 84 of the object location may be performed, stored in a datastore 92, and displayed in a user's display 78.

When a firearm 20 or other threatening object is determined, the radar module 12 alert is sent over the security camera network 76 to the server 74 which enables display of the alert for safety officers or other users to review to validate the system-determined threat. As shown in FIG. 7, a video stream 82 corresponding to the alert is enlarged compared to other video camera streams 80 not corresponding to an alert. An overlay 84 of the detected firearm 20 or other potentially threating object is displayed in the video stream 82 corresponding to the alert.

To improve the overall accuracy of the system, machine learning or artificial intelligence is implemented. Alerts considered to be valid can be confirmed by a user (e.g. security personnel) monitoring the video streams 80, 82, for example via a "confirm" touch display button 86. Alerts considered to be invalid (i.e., false alerts) can be rejected by a user, for example via a "reject" touch indicator 94. This information is sent back over the network 76 to the radar module 12 via the wired connection 26 or the wireless connection 28. In this manner, information about the detected threat is fed back to the radar module 12, and the signal processor 34 adjusts its algorithms and/or reference shapes stored in a reference datastore 32 to provide improved detection performance.

Figure 9:
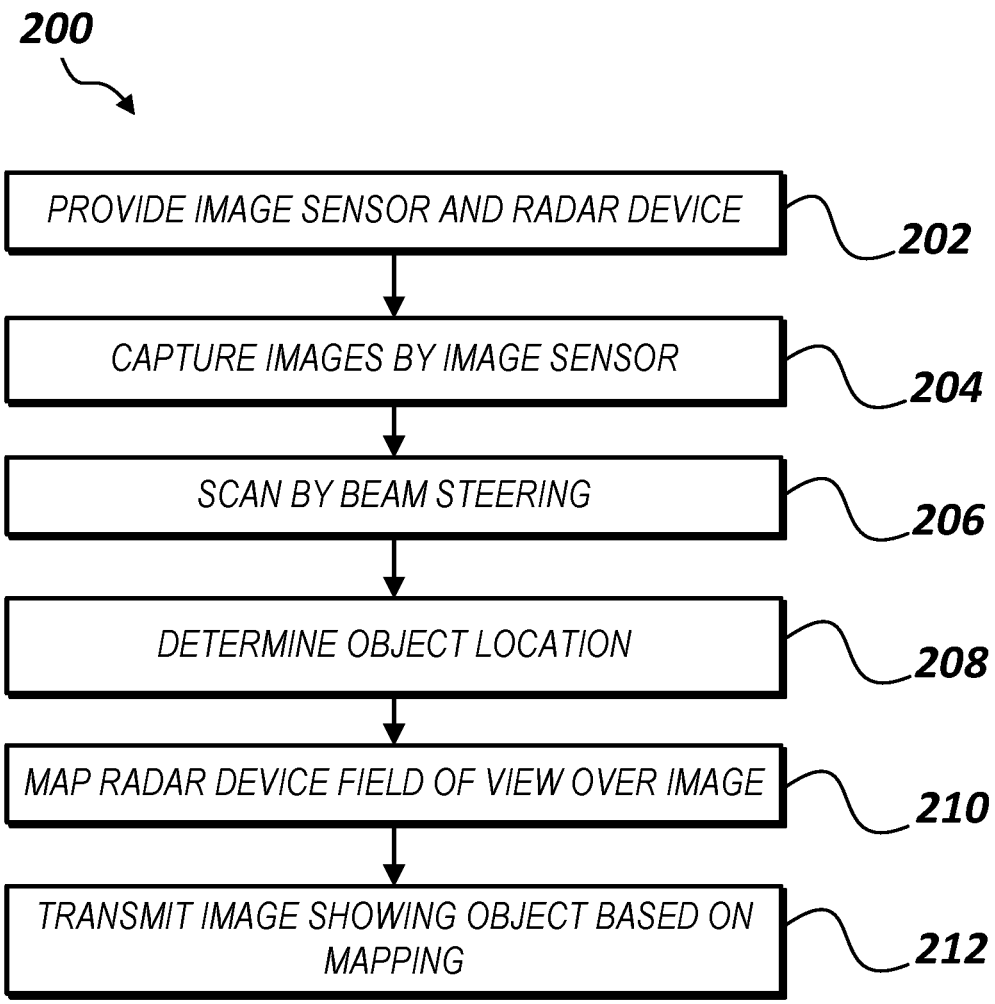
FIGS. 9-10 are flow charts showing methods for detecting and communicating potential security threats.

Referring to FIG. 9, a method 200 is shown for detecting and communicating potential security threats. The method 200 and associated processes are described with reference to the included components of the monitoring system 8 described above. The method 200 can alternatively be performed by other suitable systems. The method 200 includes providing an image sensor configured for image capture and a radar device comprising a phased array of antennas configured to transmit and receive (step 202). One or more images are captured by the image sensor (step 204). Capturing the one or more images can include capturing a video. Signals emitted by the phased array of antennas are beam steered to scan a field of view of the radar device, and reflected signals are received by the phased array of antennas (step 206). A location of a particular object is determined based on the signals received by the phased array of antennas (step 208). Determining the location of the particular object can include determining coordinate information including distance, azimuth, and elevation relative to the phased array of antennas. A field of view of the radar device is mapped over the one or more images captured by the image sensor (step 210). Mapping the field of view can include electronically mapping the distance, elevation, and the azimuth on the one or more images. The one or more images captured by the image sensor are transmitted showing the particular object based on the mapping of the field of view of the radar device over the one or more images captured by the image sensor (step 212). Transmitting the one or more images can include transmitting one or more frames of the video showing the particular object based on the mapping of the field of view of the radar device over the one or more images, or transmitting an alert indicating the location of the particular object on the one or more frames of the video based on the mapping of the field of view of the radar device over the one or more images.

The particular object can include a person alone or a person carrying a metallic object. Beneficially, based on the signals received by the phased array of antennas it is detected that the particular object comprises metal or other particular material, and the one or more images or an alert are transmitted responsive to detecting the metal or other particular material on the particular object. The particular object can be determined to include a first object such as a human body based on one or more of a first strength, a first frequency signature, a first polarization, or a first frequency resonance of the signals received by the phased array of antennas. The particular object can further be determined to include a second object or more objects such as a metal firearm based on one or more of a second strength, a second frequency signature, a second polarization, or a second frequency resonance of the signals received by the phased array of antennas. An alert can be transmitted responsive to determining the particular object includes the first object and the second object, which alert can include the image with an overlay highlighting one or both of the first object and the second object.

In addition to capturing images with the image sensor, the particular object can be imaged based on the reflected signals received by the phased array of antennas. A form of the second object can be determined based on the imaging of the particular object based on the reflected signals received by the antennas. The form of the second object can be compared with stored reference shapes, and an alert indication can be transmitted responsive to determining the particular object comprises the first object and the second object, and based on the comparing of the form of the second object with the stored reference shapes. A confirmation or rejection of an alert can be received from a user, in which case in the future one or more steps including determining the particular entity comprises one or more objects, determining a form of one or more objects, or comparing the form an object with a reference form are further based on the confirmation of the alert from the user, for example by updating one or more algorithms or reference forms based on an alert confirmation or rejection.

A first portion of the imaged particular object can be determined to include a human body based one or more of a first strength, a first frequency signature, a first frequency resonance of the signals received by the phased array of antennas, or a first elevation, and a second portion of the imaged particular object can be determined to include a metallic object based on one or more of a second strength, a second frequency signature, a second frequency, resonance of the signals received by the phased array of antennas, or a second elevation, and an alert indication can be transmitted responsive to determining the particular object comprises the first and second portions or responsive to determining the particular object comprises the first and second portions at corresponding first and second elevations, which alert can be transmitted with an overlay highlighting the second portion. The human body can be determined to include one or more appendages based on a calculated speed of the appendage relative to at least one other portion of the human body (e.g., the torso) based on the reflected signals received by the phased array of antennas. The metallic object can be determined to be positioned on an appendage based on the reflected signals, and an alert indication can be transmitted responsive to determining the metallic object is positioned on the appendage.

Alternatively, a first portion of the particular object can be determined to be at a first elevation and include a first material such as a portion of a human body based on one or more of a first strength, a first frequency signature, first polarization, or a first frequency resonance of the signals received by the phased array of antennas, and a second portion of the particular object can be determined to be at a second elevation higher than the first elevation and including a second material such as a metallic material of a firearm based on one or more of a second strength, a second frequency signature, second polarization, or a second frequency resonance of the signals received by the phased array of antennas, and a third portion of the particular object can be determined to be at a third elevation higher than the second elevation and comprising the first material based on one or more of the first strength, the first frequency signature, the first polarization, or the first frequency resonance of the signals received by the phased array of antennas, wherein an alert indication is transmitted responsive to determining the particular object comprises the first material at the first elevation, the second material at the second elevation, and the first material at the third elevation, wherein the alert can include the image with an overlay highlighting the second portion of the particular object.

Figure 10:
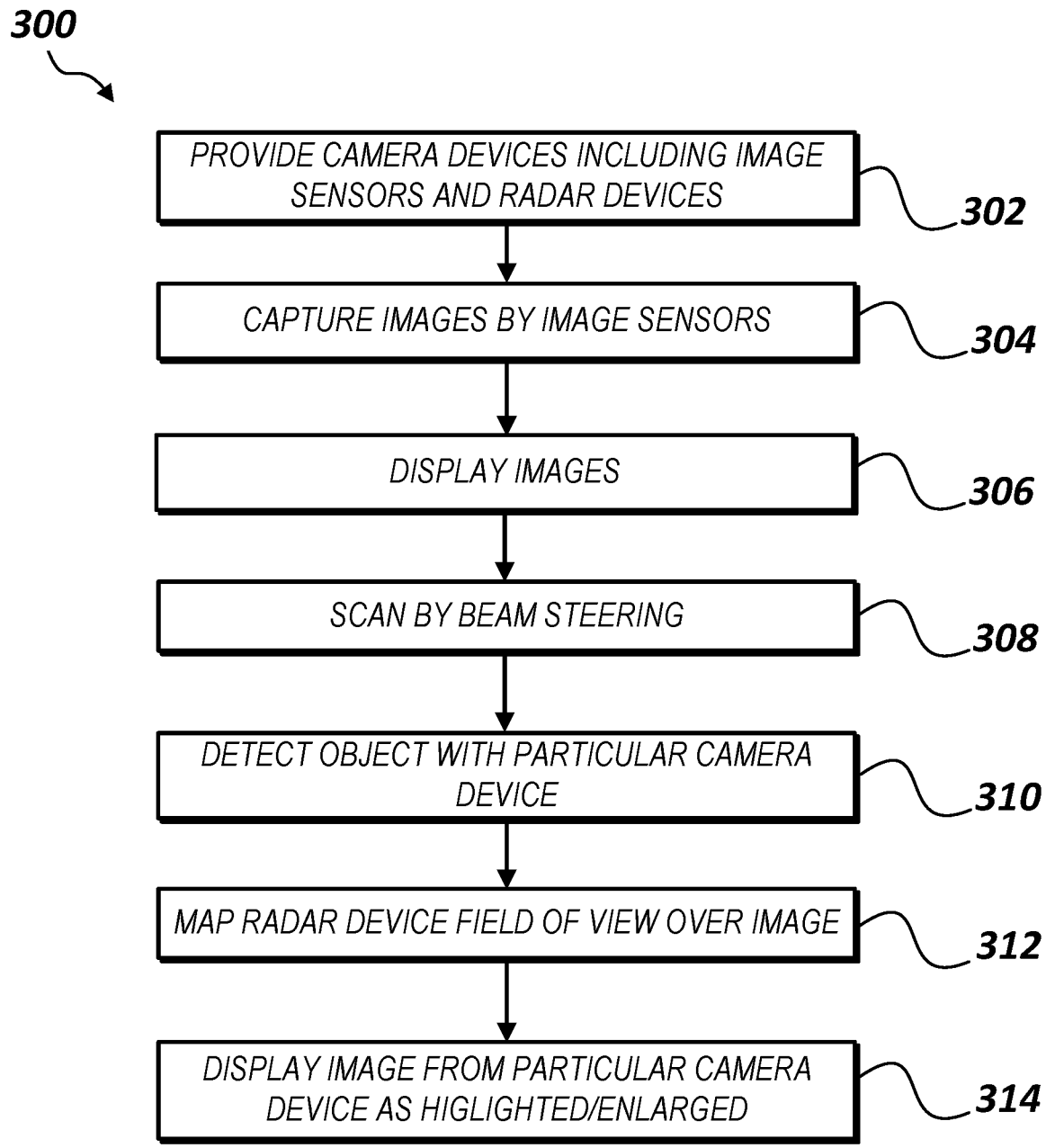

Referring to FIG. 10, a method 300 includes providing a plurality of camera devices comprising an image sensor configured for video capture and a radar device comprising a phased array of antennas configured to transmit and receive (step 302). The image sensors of the plurality of camera devices capture a plurality of video images (step 304). The plurality of video images of the plurality of camera devices are displayed on one or more displays (step 306). Signals emitted by the phased array of antennas of the plurality of camera devices are beam steered to scan fields of view of the radar devices, and reflected signals are received by the phased array of antennas of the plurality of camera devices (step 308). A particular object is detected based on the signals received by the phased array of antennas of a particular camera device of the plurality of camera devices (step 310). A field of view of the radar device of the particular camera device is mapped over the video images captured by the image sensor of the particular camera device (step 312), and the video images captured by the image sensor of the particular camera device are displayed at least one of highlighted or enlarged relative to video images captured by the image sensor one or more others of the plurality of camera devices based on the detecting of the particular object and based on the mapping of the field of view of the radar device over video images captured by the image sensor of the particular camera device (step 314).

Although features and elements are described above in particular combinations, one of ordinary skill in the art will appreciate that each feature or element can be used alone or in any combination with the other features and elements. Methods described herein may be implemented in a computer program, software, or firmware incorporated in a computer-readable medium for execution by a computer or processor.

While embodiments have been described in detail above, these embodiments are non-limiting and should be considered as merely exemplary. Modifications and extensions may be developed, and all such modifications are deemed to be within the scope defined by the appended claims.

What is claimed is:

1. A method comprising:
   providing an image sensor configured for image capture and a radar device comprising a phased array of antennas configured to transmit and receive;
   capturing at least one image by the image sensor;
   beam steering signals emitted by the phased array of antennas to scan a field of view of the radar device and receiving reflected signals by the phased array of antennas;
   determining based on the reflected signals received by the phased array of antennas a location of a particular object;
   determining a first portion of the particular object comprises a human body based on at least one of a first strength, a first frequency signature, a first polarization, or a first frequency resonance of the reflected signals received by the phased array of antennas;
   determining the human body comprises at least one human appendage based on a calculated speed of the at least one human appendage relative to at least one other portion of the human body based on the reflected signals received by the phased array of antennas;
   determining a second portion of the particular object comprises a metallic object based on at least one of a second strength, a second frequency signature, a second polarization, or a second frequency resonance of the reflected signals received by the phased array of antennas;
   determining based on the on the reflected signals received by the phased array of antennas that the metallic object is positioned on the at least one human appendage;
   mapping the field of view of the radar device over the at least one image captured by the image sensor;
   transmitting the at least one image captured by the image sensor showing the first portion of the particular object and the second portion of the particular object based on the mapping of the field of view of the radar device over the at least one image captured by the image sensor; and
   transmitting an alert indication responsive to determining the metallic object is positioned on the at least one human appendage.

2. The method of claim 1, further comprising:
   detecting based on the reflected signals received by the phased array of antennas the particular object comprises metal; and transmitting the at least one image responsive to detecting the metal on the particular object.

3. A method comprising:
providing an image sensor configured for image capture and a radar device comprising a phased array of antennas configured to transmit and receive;
capturing at least one image by the image sensor;
beam steering signals emitted by the phased array of antennas to scan a field of view of the radar device and receiving reflected signals by the phased array of antennas;
determining based on the reflected signals received by the phased array of antennas a location of a particular object;
processing the reflected signals by Inverse Synthetic Aperture Radar ("ISAR") to image the particular object;
determining the particular object comprises a first object based on at least one of a first strength, a first frequency signature, a first polarization, or a first frequency resonance of the reflected signals received by the phased array of antennas;
determining the particular object comprises a second object based on at least one of a second strength, a second frequency signature, a second polarization, or a second frequency resonance of the reflected signals received by the phased array of antennas;
determining a form of the second object based on the imaging of the particular object by the ISAR based on the reflected signals received by the phased array of antennas;
comparing the form of the second object with stored reference shapes;
mapping the field of view of the radar device over the at least one image captured by the image sensor;
transmitting the at least one image captured by the image sensor showing the first object and the second object based on the mapping of the field of view of the radar device over the at least one image captured by the image sensor; and
transmitting an alert indication responsive to determining the particular object comprises the first object and the second object and based on the comparing of the form of the second object with the stored reference shapes, the transmitting of the alert indication comprising displaying of the form of the second object over the at least one image.

4. The method of claim 3, further comprising:
detecting based on the reflected signals received by the phased array of antennas the particular object comprises metal; and
transmitting the alert indication further responsive to detecting the metal.

5. The method of claim 3, wherein the particular object comprises at least one of a person or a metallic object.

6. The method of claim 3, further comprising:
determining based on the reflected signals received by the phased array of antennas a speed of the particular object; and
transmitting an indication of the speed of the particular object.

7. The method of claim 3, wherein the first object comprises at least a portion of a human body and the second object comprises a metallic material.

8. The method of claim 1, further comprising electronically adjusting a directionality of the phased array of antennas to receive the reflected signals from varying directions.

9. The method of claim 1, wherein the image sensor and the phased array of antennas are positioned in close proximity, and the image sensor and the phased array of antennas are directed in substantially the same direction.

10. The method of claim 1, further comprising using at least one of constant wave (CW), frequency modulated constant wave ("FMCW"), or multi-frequency constant wave ("MFCW") modulated signals to determine a range to the particular object and a material classification of the particular object.

11. The method of claim 1, wherein:
capturing the at least one image comprises capturing a video; and
transmitting the at least one image comprises transmitting at least one frame of the video showing the particular object based on the mapping of the field of view of the radar device over the at least one image, and the alert indication indicating the location of the particular object on the at least one frame of the video based on the mapping of the field of view of the radar device over the at least one image.

12. The method of claim 1, wherein:
determining the location of the particular object comprises determining coordinate information including distance and azimuth relative to the phased array of antennas;
the mapping of the field of view comprises electronically mapping the distance and the azimuth on the at least one image; and
transmitting the at least one image showing the particular object comprises transmitting the alert indication indicating the location of the particular object in the at least one image.

13. The method of claim 1, further comprising:
imaging the particular object based on the reflected signals received by the phased array of antennas;
determining a form of the second portion based on the imaging of the particular object based on the reflected signals received by the phased array of antennas; and
displaying of the form of the second portion over the at least one image.

14. The method of claim 1, wherein:
determining the location of the particular object comprises determining coordinate information including distance, azimuth, and elevation relative to the phased array of antennas;
mapping the field of view comprises electronically mapping the distance, the azimuth, and the elevation on the at least one image; and
transmitting the at least one image showing the particular object comprises transmitting the alert indication indicating the location of the particular object in the at least one image.

15. The method of claim 1, further comprising:
determining the first portion of the particular object is at a first elevation based on the at least one of the first strength, the first frequency signature, the first polarization, or the first frequency resonance of the reflected signals received by the phased array of antennas;
determining at least the second portion of the particular object is at a second elevation based on the at least one of the second strength, the second frequency signature, the second polarization, or the second frequency resonance of the reflected signals received by the phased array of antennas; and transmitting the alert indication further responsive to determining the particular object comprises the human body at the first elevation and the metallic object at the second elevation.

16. The method of claim 1, wherein transmitting the alert indication comprises transmitting the at least one image with an overlay highlighting the second portion of the particular object.

17. The method of claim 1, further comprising:
determining the first portion of the particular object is at a first elevation based on the at least one of the first strength, the first frequency signature, the first polarization, or the first frequency resonance of the reflected signals received by the phased array of antennas;
determining the second portion of the particular object is at a second elevation higher than the first elevation based on the at least one of the second strength, the second frequency signature, the second polarization, or the second frequency resonance of the reflected signals received by the phased array of antennas;
determining a third portion of the particular object at a third elevation higher than the second elevation comprises the human body based on the at least one of the first strength, the first frequency signature, the first polarization, or the first frequency resonance of the reflected signals received by the phased array of antennas; and
transmitting the alert indication further responsive to determining the particular object comprises the human body at the first elevation, the metallic object at the second elevation, and the human body at the third elevation.

18. The method of claim 17, wherein
transmitting the alert indication comprises transmitting the at least one image with an overlay highlighting the second portion of the particular object.

19. The method of claim 1, further comprising:
imaging the particular object based on the reflected signals received by the phased array of antennas;
determining a form of the second portion based on the imaging of the particular object based on the reflected signals received by the phased array of antennas;
comparing the form of the second portion with stored reference shapes; and
transmitting the alert indication further based on the comparing of the form of the second portion with the stored reference shapes.

20. The method of claim 19, further comprising:
receiving from a user a confirmation of the alert indication;
imaging a particular entity based on the reflected signals received by the phased array of antennas;
determining the particular entity comprises a third portion based on at least one of a third strength, a third frequency signature, a third polarization, or a third frequency resonance of the reflected signals received by the phased array of antennas;
determining the particular entity comprises a fourth portion based on at least one of a fourth strength, a fourth frequency signature, a fourth polarization, or a fourth frequency resonance of the reflected signals received by the phased array of antennas;
determining a form of the fourth portion based on the imaging of the particular entity;
comparing the form of the fourth portion with the stored reference shapes; and transmitting another alert indication responsive to determining the particular entity comprises the third portion and the fourth portion, based on the comparing of the form of the fourth portion with the stored reference shapes;
wherein at least one of the steps of determining the particular entity comprises the third portion, determining the particular entity comprises the fourth portion, determining the form of the fourth portion, or comparing the form of the fourth portion are further based on the confirmation of the first alert indication from the user.

21. The method of claim 1, further comprising:
imaging the particular object based on the reflected signals received by the phased array of antennas;
determining a form of the second portion based on the imaging of the particular object based on the reflected signals received by the phased array of antennas;
comparing the form of the second portion with stored reference shapes; and
transmitting the alert indication further responsive to determining the particular object comprises the first portion and the second portion and based on the comparing of the form of the second portion with the stored reference shapes, the transmitting of the alert indication comprising displaying of the form of the second portion over the at least one image.

22. The method of claim 3, further comprising:
detecting based on the reflected signals received by the phased array of antennas the particular object comprises a particular material; and
transmitting the alert indication further responsive to detecting the particular material on the particular object.

23. The method of claim 3, further comprising:
determining an angle of arrival of the particular object based on a phase difference of the reflected signals received by the phased array of antennas between two or more antennas; and
transmitting an indication of the angle of arrival.

24. The method of claim 3, further comprising:
determining a material of the particular object based on at least one of a particular strength, a particular frequency signature, or a particular frequency resonance of the reflected signals received by the phased array of antennas; and
transmitting an indication of the material of the particular object.

25. The method of claim 3, further comprising determining the second object is metallic based on the at least one of the second strength, the second frequency signature, or the second frequency resonance of the reflected signals received by the phased array of antennas.

26. The method of claim 3, wherein transmitting the alert indication comprises transmitting the at least one image with an overlay highlighting the second object.

27. The method of claim 3, wherein transmitting the alert indication comprises transmitting the at least one image with an overlay highlighting the first object and the second object.

28. A method comprising:
providing a plurality of camera devices comprising an image sensor configured for video capture and a radar device comprising a phased array of antennas configured to transmit and receive;
capturing a plurality of video images by the image sensors of the plurality of camera devices;

displaying the plurality of video images of the plurality of camera devices on at least one display;
beam steering signals emitted by the phased array of antennas of the plurality of camera devices to scan fields of view of the radar devices and receiving reflected signals by the phased array of antennas of the plurality of camera devices;
detecting a particular object based on the reflected signals received by the phased array of antennas of a particular camera device of the plurality of camera devices, the detecting the particular object comprising imaging the particular object by processing the reflected signals received by the phased array of antennas by Inverse Synthetic Aperture Radar ("ISAR");
determining the particular object comprises a first object based on at least one of a first strength, a first frequency signature, a first polarization, or a first frequency resonance of the reflected signals received by the phased array of antennas;
determining the particular object comprises a second object based on at least one of a second strength, a second frequency signature, a second polarization, or a second frequency resonance of the reflected signals received by the phased array of antennas;
determining a form of the second object based on the imaging by the ISAR of the particular object based on the reflected signals received by the phased array of antennas;
comparing the form of the second object with a datastore of at least one reference form;
mapping the field of view of the radar device of the particular camera device over the video images captured by the image sensor of the particular camera device;
displaying the video images captured by the image sensor of the particular camera device at least one of highlighted or enlarged relative to the video images captured by the image sensor of at least one other camera device of the plurality of camera devices based on the detecting of the particular object and based on the mapping of the field of view of the radar device of the particular camera device over the video images captured by the image sensor of the particular camera device; and
transmitting an alert indication responsive to determining the particular object comprises the first object and the second object and based on the comparing of the form of the second object with the datastore of the at least one reference form, the transmitting of the alert indication comprising displaying of the form of the second object over the video images captured by the image sensor of the particular camera device.

29. The method of claim 28, wherein the detecting of the particular object comprises detecting a particular material based on the reflected signals received by the phased array of antennas of the particular camera device, the method further comprising displaying the video images captured by the image sensor of the particular camera device with an overlay highlighting the particular object.

30. The method of claim 28, further comprising:
receiving at least one of a user confirmation or a user rejection of the displayed video images captured by the image sensor of the particular camera device; and
updating the at least one reference form based on the at least one of the user confirmation or the user rejection.

31. The method of claim 28, further comprising:
receiving at least one of an indication of a confirmation or an indication of a rejection of the video images captured by the image sensor of the particular camera device; and
detecting a particular entity after detecting the particular object based on the reflected signals received by the phased array of antennas of the particular camera device of the plurality of camera devices and the at least one of the indication of the confirmation or the indication of the rejection.

32. A camera system comprising:
an image sensor configured for image capture;
a radar device comprising a phased array of antennas configured to transmit and receive at a frequency greater than 24 GHz and less than 81 GHz and a bandwidth of less than or equal to 4 GHz; and
at least one processor configured to:
beam steer signals emitted by the phased array of antennas to scan a field of view of the radar device and receiving reflected signals by the phased array of antennas;
determine based on the reflected signals received by the phased array of antennas a location of an entity, and determining the entity comprises a particular individual based on at least one of a first strength, a first frequency signature, a first polarization, or a first frequency resonance of the reflected signals received by the phased array of antennas;
determine based on at least one of a second strength, a second frequency signature, a second polarization, or a second frequency resonance of the reflected signals received by the phased array of antennas a particular object carried by the particular individual;
process the signals reflected received by the phased array of antennas by Inverse Synthetic Aperture Radar ("ISAR") to image the particular object;
determine a form of the particular object based on the imaging by the ISAR of the particular object based on the reflected signals received by the phased array of antennas;
compare the form of the particular object with stored reference shapes;
map the field of view of the radar device over a field of view of the image sensor;
transmit an image captured by the image sensor showing the particular individual based on the mapping of the field of view of the radar device over the field of view of the image sensor; and
transmit an alert indication highlighting the particular object as imaged by the ISAR within the image captured by the image sensor responsive to determining the particular individual and the particular object and based on the comparing of the form of the particular object with the stored reference shapes, the transmitting of the alert indication comprising displaying of the form of the particular object over the image captured by the image sensor.

33. The camera system of claim 32, wherein the phased array of antennas comprises at least a 2×2 array of antennas, wherein each of the antennas in the phased array of antennas is configured to transmit and receive.

34. A method comprising:
providing an image sensor configured for image capture and a radar device comprising a phased array of antennas configured to transmit and receive;

capturing at least one image by the image sensor;

beam steering signals emitted by the phased array of antennas to scan a field of view of the radar device and receiving reflected signals by the phased array of antennas;

determining based on the reflected signals received by the phased array of antennas a location of a particular object;

imaging the particular object based on the reflected signals received by the phased array of antennas;

determining the particular object comprises a first object based on at least one of a first strength, a first frequency signature, a first polarization, or a first frequency resonance of the reflected signals received by the phased array of antennas;

determining the particular object comprises a second object based on at least one of a second strength, a second frequency signature, a second polarization, or a second frequency resonance of the reflected signals received by the phased array of antennas;

determining a form of the second object based on the imaging of the particular object based on the reflected signals received by the phased array of antennas;

comparing via an algorithm the form of the second object with stored reference shapes;

mapping the field of view of the radar device over the at least one image captured by the image sensor;

transmitting the at least one image captured by the image sensor showing the first object and the second object based on the mapping of the field of view of the radar device over the at least one image captured by the image sensor;

transmitting a first alert indication responsive to determining the particular object comprises the first object and the second object and based on the comparing via the algorithm of the form of the second object with the stored reference shapes;

receiving from a user feedback comprising at least one of a confirmation or a rejection responsive to the first alert indication;

adjusting at least one of the algorithm or the stored reference shapes based on the feedback from the user;

imaging a particular entity based on the reflected signals received by the phased array of antennas;

determining the particular entity comprises a third object based on at least one of a third strength, a third frequency signature, a third polarization, or a third frequency resonance of the reflected signals received by the phased array of antennas;

determining a form of the third object based on the imaging of the particular entity;

comparing via the algorithm the form of the third object with the stored reference shapes, the at least one of the algorithm or the reference shapes being adjusted based on the feedback from the user; and transmitting a second alert indication responsive to determining the particular entity comprises the third object and based on the comparing via the algorithm of the form of the third object with the stored reference shapes.

* * * * *